Oct. 25, 1932. E. A. RUSSELL 1,884,266
FLEXIBLE PIPE STRUCTURE
Filed June 8, 1929 3 Sheets-Sheet 3
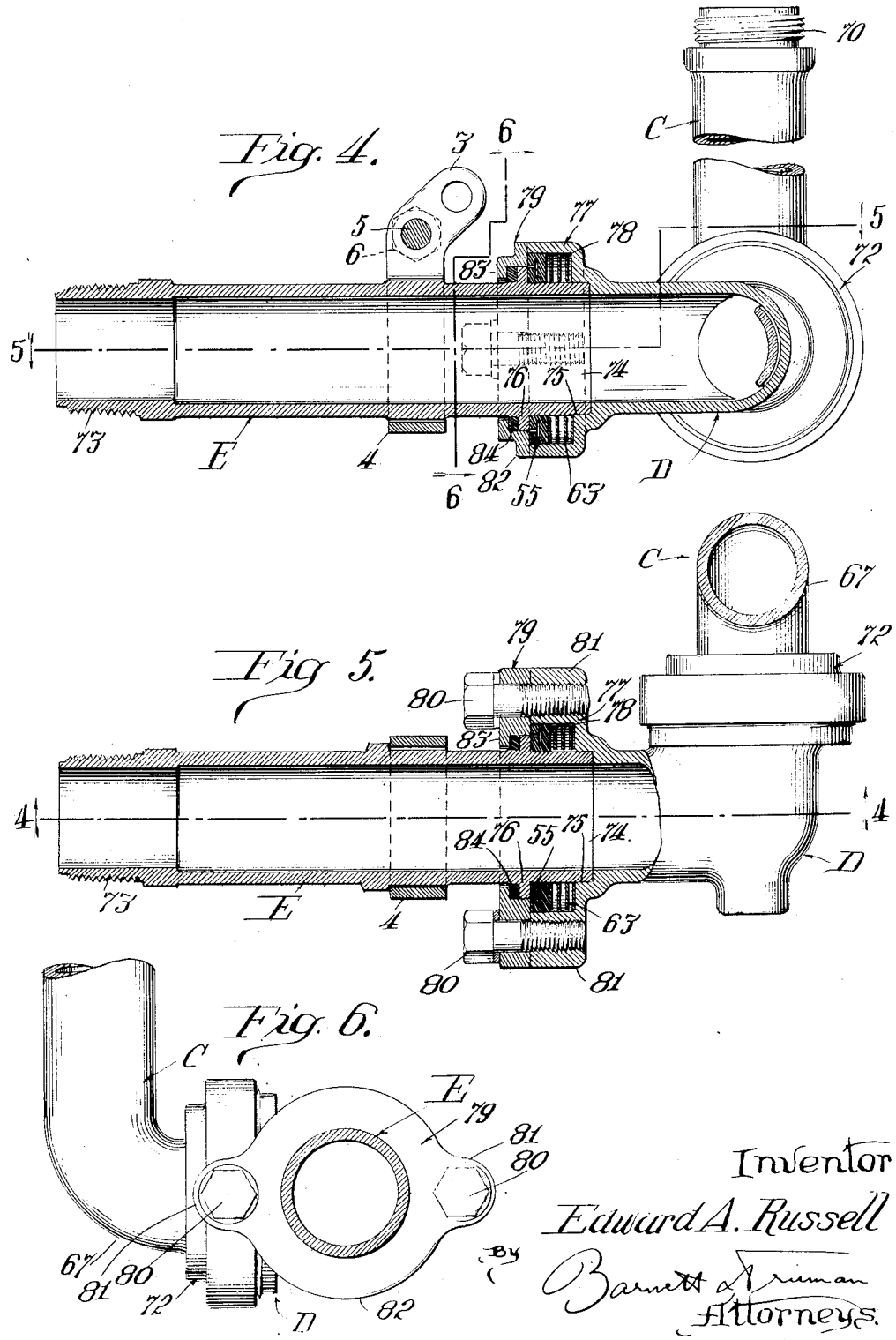

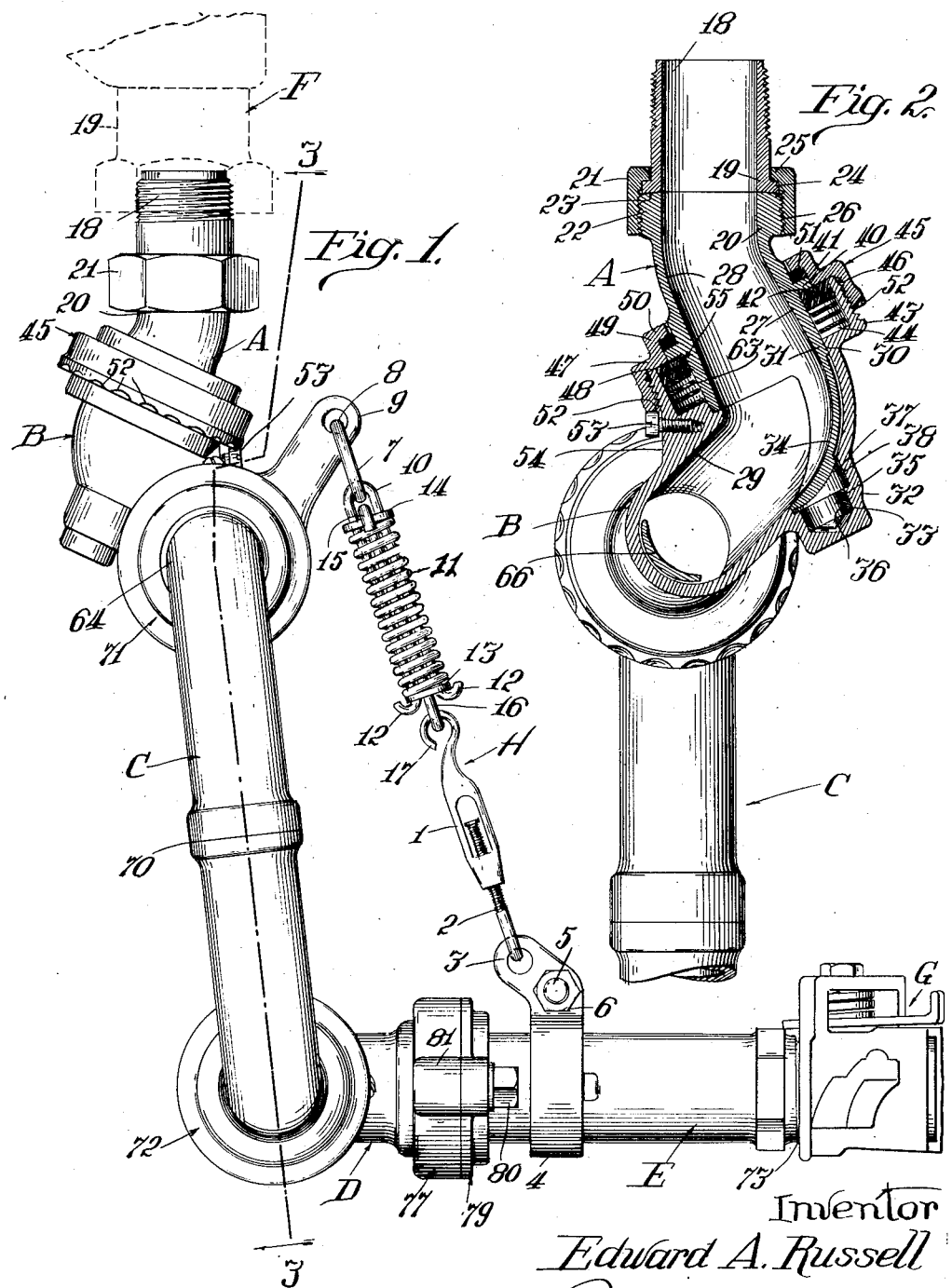

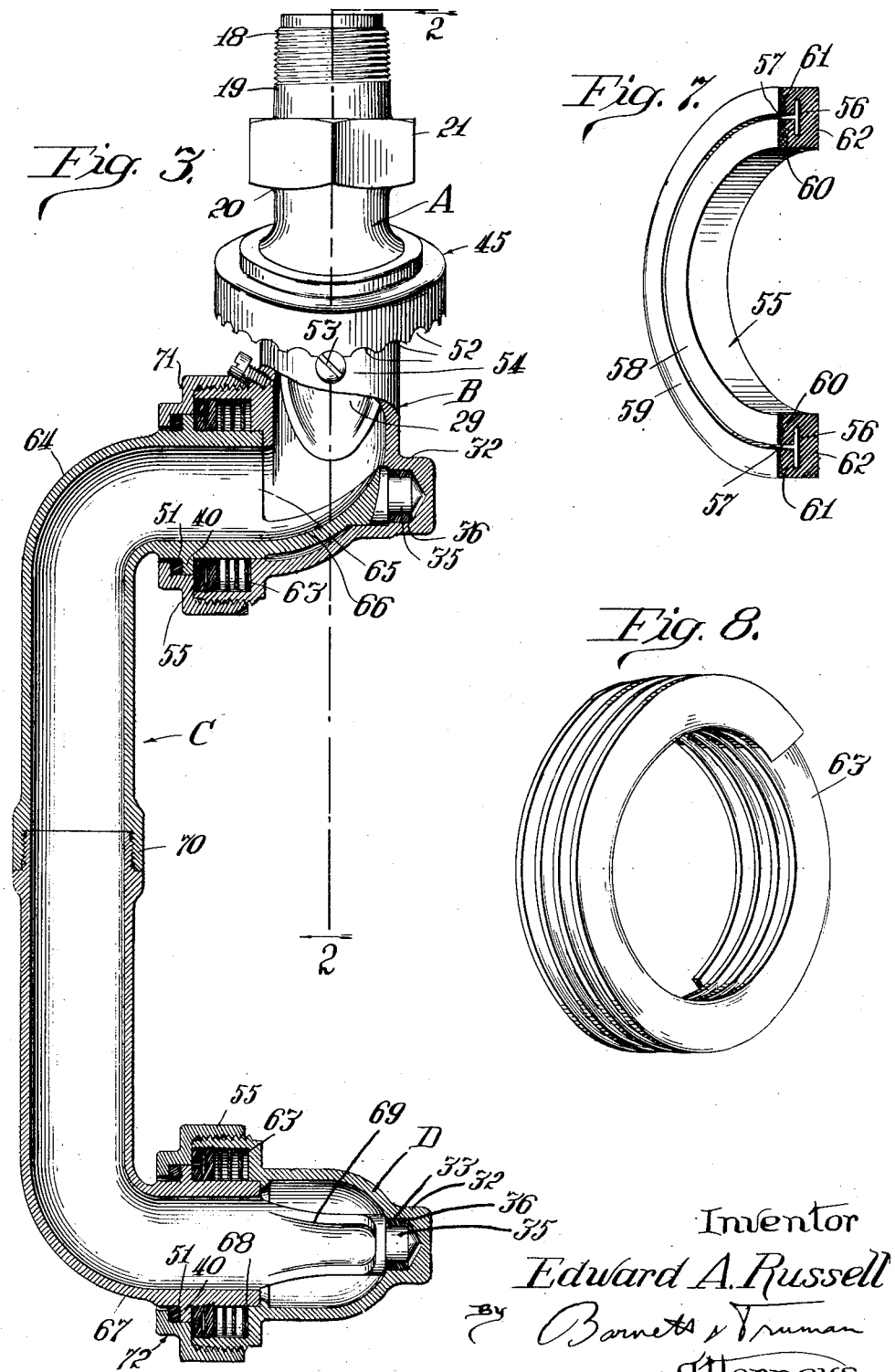

Patented Oct. 25, 1932

1,884,266

UNITED STATES PATENT OFFICE

EDWARD A. RUSSELL, OF CHICAGO, ILLINOIS, ASSIGNOR TO VAPOR CAR HEATING COMPANY, INC., OF CHICAGO, ILLINOIS, A CORPORATION OF NEW YORK

FLEXIBLE PIPE STRUCTURE

Application filed June 8, 1929. Serial No. 369,440.

This invention relates to a conduit or tubular structure consisting of metal elements flexibly articulated or swiveled together so as to form a fluid tight connection between the train pipes of the adjacent cars of a railway train. The complete connection consists of two of these flexible structures, one for each of the train pipes to be connected, these structures being coupled together by any suitable form of coupler such as has been used with the rubber hoses heretofore generally employed for making this connection.

This improved conduit structure consists of a plurality of tubular conduit members, some of which are formed with elbows, the ends of each adjacent pair of members being telescoped one within the other and provided with means for sealing the joint against the escape of steam without interfering with relative rotation between the members about the axis of the telescoped conduit members. The several elbows and swiveled joints between the members are so arranged that although one end of the flexible structure is rigidly supported from the car train pipe, the coupler mounted at the other end of the structure is permitted a practically universal movement in any direction to allow for the relative movements between the cars and to permit the two couplers to be secured together or disconnected.

The present invention embodies improved means for swiveling the telescoped ends of he conduit members so as to provide increased bearing surfaces and more advantageously supports the load. One member is formed with an elbow adjacent the open end which is provided with an inner annular sleeve bearing, and a bearing socket coaxial with the annular bearing but spaced therefrom is formed within the elbow opposite the open end. The end portion of the mating conduit member is swiveled or pivoted within the annular sleeve bearing, and has a forwardly projecting portion which is journaled within the socket bearing. This provides two spaced coaxial bearings for the members whereby the twisting strains are distributed and the conduit structure is rendered stronger, more flexible and more durable. The inner conduit member is provided with an outwardly projecting annular shoulder, and the outer conduit member has a portion projecting around this shoulder and provided with a removable annular collar member projecting behind the shoulder, there being a thrust bearing interposed between the two shoulder members to resist the internal pressure in the conduit tending to separate the two telescoped conduit members. The outwardly projecting annular shoulder on the inner member is provided with a radially extending bearing surface on its opposite face, and a similar annular bearing surface is provided on a part of the outer conduit member in substantially the same radial plane. A gasket positioned between the two conduit members is yieldably held in engagement with the two separate and relatively rotatable radial bearing surfaces by means of a spring positioned at the opposite side of the gasket and by means of the steam pressure within the conduit. The bearing surface of the gasket is split so as to provide two independently movable annular portions which independently engage the radial bearing surfaces on the inner and outer conduit members.

The particular object of this invention is to provide an improved flexible metallic conduit structure, such as briefly described hereinabove and disclosed more in detail in the specifications which follow.

Another object is to provide improved means for journaling the two conduit members in telescoped relation and for accepting the thrust tending to separate the members.

Another object is to provide an improved form of sealing means for preventing the escape of steam or other fluid between the relatively rotatable conduit sections.

Another object is to provide an improved form of gasket comprising two relatively adjustable sealing portions whereby a limited longitudinal displacement of the sections due to wear of the parts will not interfere with the proper functioning of the sealing means.

Other objects and advantages of the invention will be more apparent from the following detailed description of one approved form of apparatus embodying the principles of the invention.

In the accompanying drawings:

Fig. 1 is a side elevation of the assembled flexible conduit structure.

Fig. 2 is a partial vertical section taken substantially on the line 2—2 of Fig. 3.

Fig. 3 is a vertical section taken substantially on the line 3—3 of Fig. 1.

Fig. 4 is a vertical section through the lower horizontally extending end section of the conduit, this view being taken substantially on the line 4—4 of Fig. 5.

Fig. 5 is a horizontal section, taken substantially on the line 5—5 of Fig. 4.

Fig. 6 is a partial vertical section taken substantially on the line 6—6 of Fig. 4.

Fig. 7 is a sectional perspective view of the improved gasket.

Fig. 8 is a perspective view of the gasket retaining spring.

The flexible conduit structure consists of a plurality of rigid conduit members A, B, C, D and E, which are swiveled together as hereinafter explained in detail. The uppermost conduit member A is adapted to support the entire assembly by being attached to the end of the car train pipe, or more usually to the end train pipe valve indicated by dotted lines at F in Fig. 1. The coupler member G, which may be of any approved form, is mounted at the free end of the conduit member E at the lower horizontally extending end of the flexible structure. This coupler G is adapted to be mated with a similar coupler on the adjacent car.

A means shown generally at H is provided to support the lower members D, E and G of the structure when disconnected from an adjacent car coupling. In the form here shown, this connection H comprises a turn-buckle 1 having a hook 2 at its lower end engaging with an eye 3 formed on a split ring 4 which is clamped about the lower conduit member E by means of a bolt 5 and nut 6. An upper link 7 has a hooked upper end 8 engaging in a bracket arm 9 extending upwardly and outwardly from one side of the upper elbow conduit member B and projecting over the lower horizontally extending conduit member E. The lower end of the link 7 is hooked within the closed end of a U-shaped member 10 which projects downwardly through a compression spring 11. The lower hooked ends 12 of member 10 engage about an annular washer 13 which forms an abutment for one end of the compression spring 11. A similar washer 14 at the other end of spring 11 is engaged by the hooked ends 15 of a U-shaped member 16 similar to the member 10. The lower closed end of member 16 is engaged within the hook 17 at the upper end of turn-buckle 1. This assembled supporting connection is not only sufficiently flexible to permit the necessary movements of the lower horizontally extending conduit members, but the compression spring 11 will also give sufficiently to permit the necessary extension of the conduit structure when the train is rounding curves. It will be apparent from the description which follows that when the coupler G is disconnected from a mating coupler, the supporting means H will hold the assembly C, D, E and G from swinging backwardly and downwardly about the swiveled joint at the lower end of elbow member B. The rearward inclination of the swiveled joint at the upper end of the elbow B will also tend to prevent the complete conduit assembly from swinging to one side or the other about the upper supporting conduit member A. The entire structure will therefore tend to remain in substantially the position shown in Fig. 1 even though the couplers G are disconnected.

The upper conduit member A is provided with an externally threaded upper end portion 18 whereby it is engaged with the downwardly projecting end of the car train pipe or end train pipe valve indicated at F. The upper conduit member A will usually be formed of two sections 19 and 20, joined by a coupling collar 21. The lower section 20 is provided at its upper end with an outstanding collar 22 having an upper spherical end surface 23 which engages a mating concave surface at the lower end of a similar collar 24 on the upper section 19. The coupling collar 21 has an upper inwardly extending flange 25 adapted to engage behind the collar 24 and is interiorly threaded at 26 to engage the threaded outer portion of collar 22. A limited lateral adjustment is permitted between the mating curved end surfaces of the sections 19 and 20 to secure the proper vertical alignment of the conduit structure. Also different upper adapter sections 19 can be substituted for the one here shown, these sections being curved in one direction or another or provided with different sized end portions 18 in order to adjust the conduit structure and support same from any type of car train pipe or end valve.

The inner cylindrical wall 27 of the conduit member A is practically continuous from one end of the member to the other to form an unbroken steam passage of constant diameter. The lower portion of conduit A is inclined rearwardly at a small angle, as indicated at 28 in Fig. 2, for a reason that will be more apparent hereinafter. The elbow member B has an inner steam passage 29 of substantially the same circular cross section as the passage 27 in the member A, so as to form a continuation thereof. The member B is curved successively in planes at substantial right angles to one another so as to form a pair of elbow joints leading directly one from the other. The first elbow joint extends downwardly and forwardly from the connection with upper conduit member A as best shown in Fig. 2. The second elbow extends laterally from the lower end of the first elbow (as best shown in Fig 3) to connect with the upper end of the intermediate vertical conduit member C. The upper end of the upper elbow in member B is formed with an annular sleeve bearing at 30 in which is journaled the lower end portion 31 of conduit member A. A boss 32 is formed on the outer curved portion of the upper elbow of member B and in this boss is formed a socket bearing 33 which is coaxial with the annular sleeve bearing 30, and with the axis of the conduit passage in member A. An arm or extension 34 projects forwardly from the upper side of the lower end portion of member A and terminates in a stud 35 journaled in a bearing ring or bushing 36 in the socket bearing 33. This bushing 36 is preferably formed of a material known as "Noscorite", this being a composition of a phenolic condensation product and a natural clay having exceptional lubricating qualities. This composition material is very hard but is self-lubricating. The extension arm 34 has an arcuate cross section (preferably forming a true continuation of a portion of the end section of member A) so that it will fit snugly against the inner wall of the passage in elbow member B and offer the minimum of obstruction to the continuous passage of steam through the conduit. The end of the arm 34 which carries the stud 35 is enlarged as shown at 37 and housed within an opening 38 in the boss 32 so that the inner surface of this end portion of arm 34 is substantially flush with the inner surface of the conduit passage in member B as indicated at 39. It will now be apparent that the annular sleeve bearing 30 and the socket bearing 33 form two longitudinally spaced coaxial bearings for the end portion 31 and stud 35 respectively on the conduit member A so as to take up the twisting strains and prevent binding and thus materially increase the flexibility of the structure.

Upper conduit member A is provided, at a position spaced from its lower end 31, with an outwardly projecting annular collar 40, having a thrust bearing surface 41 on its rear face and a sealing surface 42 on its front face, the surfaces 41 and 42 preferably being substantially parallel and lying in spaced radial planes. The upper open end of elbow member B is enlarged at 43 to enclose an annular chamber 44 in which is housed the sealing means hereinafter described. A removable collar 45 is threaded at 46 onto the outer portion of enlargement 43. This collar 45 has an end shoulder portion 47 which projects inwardly over the end of enlargement 43 so as to fit about the outwardly projecting collar 40 on the inner conduit member A. This shoulder 47 has an inner radially extending sealing surface 48 which normally lies in substantially the same plane as the inner sealing surface 42 on the collar 40. The removable collar member 45 has a second outwardly projecting sleeve portion 49 from which extends a collar 50 projecting inwardly behind the collar 40 on the inner conduit member A. A thrust bearing ring 51, preferably of "Noscorite", is interposed between the collars 40 and 50 and serves to accept the stress of the steam pressure within the conduit which tends to expel the inner conduit member A from the elbow conduit member B in which it is telescoped.

In order to hold the members A and B in this assembled relation, the lower end of the collar 45 is scalloped or indented as indicated at 52, and a locking screw 53 is screwed into a boss 54 on elbow member B and engaged in one of these indentations 52 so as to lock the collar 45 in its applied position. Obviously, by removing the locking screw 53, the collar 45 may be unscrewed and the members A and B disassembled in order to renew or adjust the sealing means and bearing bushings or for any other reasons.

The improved sealing means is positioned within the annular recess 44 and comprises an annular gasket 55 of a size adapted to fit snugly within the upper portion of this recess and bear simultaneously at one of its ends against the two aligned sealing surfaces 42 and 48 on the respective inner and outer collars 40 and 47. This gasket is formed of a suitable rubber composition and is formed internally with an annular recess of T-shaped cross section, the leg 57 of the T extending out through the sealing face of the gasket so as to split this space into two separate annular sealing portions 58 and 59 adapted to engage the respective sealing surfaces 42 and 48 on the inner and outer collars 40 and 47. Preferably, the material in the gasket is so varied that the ring portions 60 and 61 which carry the sealing surfaces 58 and 59 respectively are made of a relatively hard and wear-resisting composition, whereas the integral rear ring portion 62 connecting these sealing rings 60 and 61 is formed of a relatively soft composition for reasons hereinafter apparent. A helical expansion spring 63, preferably formed of a coiled flat metal ribbon as shown in perspective in Fig. 8, is confined within the recess 44 behind the gasket 55 and serves to hold the gasket yieldingly in engagement with the sealing surfaces 42 and 48. When the conduit contains steam under pressure, this steam will also find its way into the recess 44 and serve to force the gasket into sealing position.

It will now be apparent that although the soft rear wall 62 of the gasket can expand to a certain extent under pressure from behind so that the gasket will engage the inner and outer cylindrical surfaces surrounding the gasket, no complete reliance is placed on either of these engaging surfaces for sealing the joint but a direct sealing engagement is formed between the gasket and the two radially extending surfaces 42 and 48 on the collars 40 and 47 on the respective inner and outer conduit members A and B. This insures a steam tight joint, since the greater the steam pressure within the joint, the greater the force tending to move the gasket into sealing position. Since the gasket is split into two annular sealing portions, one engaging each of the collar members, these collar members can get slightly out of alignment due to wear of the thrust ring 51 or other portions of the conduit structure, and the two independently movable sealing portions 60 and 61 of the gasket can adjust themselves to this condition without destroying the seal.

The upper end of the vertical conduit section C is formed with a horizontally projecting elbow portion 64 having an end portion 65 which telescopes within the lower end of the elbow member B. The mating end portions of the conduit members C and D are substantially the same in all respects as the corresponding portions of members A and B which have just been described in detail, as will be apparent from an inspection of Figs. 2 and 3. It will be observed that the forwardly projecting arm 66 of member C (corresponding to the arm 34 on member A) projects along the bottom inner surface of the lower elbow in member B so as to provide no material obstruction to the passage of steam to the conduit. One of the reasons for having the double elbow bend in member B will now be apparent. If only a single elbow were employed, the auxiliary socket bearings 33 for the respective ends of the elbow would interfere with one another, but by employing the two successive elbow bends, space is provided in each of the elbows for one of the bearing sockets 33.

The lower end of vertical conduit section C is provided with a second right-angled elbow portion 67, the horizontally extending end 68 of which is journaled within one end of the elbow member D in a manner exactly similar to the two swiveled connections already described. It will be noted, however, that the forwardly projecting arm 69 at this end of member C extends from one side of the end portion 68 instead of from the bottom like arm 66 of the upper end of conduit C. This is in order to have the arm extend around the outer bend of the single elbow in member D. It will be noted that the conduit member C is formed of sections screwed together at an intermediate point 70. The purpose of this is to permit the locking collars 71 and 72 (corresponding to locking collar 45 already described) to be placed on the conduit C behind the bearing collars 40.

The lower horizontally extending conduit member E is threaded at one end 73 to engage with and support the coupler G. The other end of conduit E is adapted to telescope within and be swiveled to the other end of the lower elbow member D, and a somewhat different form of detachable connection is here provided. Since this lower conduit section E is not subjected to the same heavy loads and twisting strains as the other sections, the auxiliary extension bearing may be omitted, and this connection is designed so as to provide as much clearance as possible beneath the conduit structure. The inner end portion 74 of conduit E is journaled within a sleeve bearing 75 formed in this end of elbow member D, and conduit E is formed with an outwardly projecting annular collar 76 similar to the collars 40 herein described. This end of elbow member D is formed with an enlargement 77 enclosing an annular recess 78 which houses the sealing assembly, which is in all respects the same as the sealing means previously described. A removable attaching plate 79 is secured in place by a pair of screw bolts 80 threaded into extensions 81 at the two sides of the end portion 77 of elbow member D. It will be noted that there are no projections at the lower side 82 of this assembly (see Fig. 6) which portion of the structure is merely of sufficient diameter to house the sealing means, thereby providing a maximum of clearance beneath the joint. The plate 79 is recessed internally to fit about and be journaled on the outer circumference of collar 76, and this plate 79 is provided with an inwardly projecting collar portion 83, a thrust ring 84 being interposed between collars 83 and 76 to accept the thrust and hold the conduit member E within the joint. It will be apparent that by simply removing the two screw bolts 80 the joint may be completely disassembled. It will be noted that the sealing gasket bears simultaneously against the inner face of collar 76 and the sealing surface 85 on the inner side of attaching plate 79, and functions the same as the sealing means hereinabove described.

It will now be apparent that the four swiveled connections between the sections A, B, C, D and E, permit rotative movements in three different planes at substantial right angles with one another so that any necessary rotative or translatory movements are permitted the coupler G. It will be noted that when unsupported by connection with an adjacent car, the members C, D, E and G would tend to swing downwardly and backwardly in the plane of the drawing, as shown in Fig. 1. This movement is prevented by the suspension device H carried at its upper end by the elbow member B. This entire assembly, including the member B, is free to swing substantially horizontally about the vertical member A, but due to the backward inclination of the lower end of the member A and the consequent tilting of this upper plane of rotation, any lateral swinging movement of the assembly just described would have to carry the supported members bodily upward to some extent so there will be a tendency for the assembly to remain in the normal position shown in Fig. 1. The backward tilting of this upper joint also makes a more compact assembly and brings the center of gravity of the supported conduit assembly more nearly under the supporting structure F.

It will be noted that although there are several curves in the steam passage through this conduit structure, the passage has a practically continuous and unbroken surface and is of substantially constant diameter from end to end of the structure. The only obstructions are caused by the projecting arms 34, 66 and 69 which extend to the auxiliary side bearings, and these arms are formed so as to conform as nearly as possible to the walls of the passage.

Each of the three main bearings where material loads are supported, and which are subjected to considerable twisting strains, are provided with the auxiliary longitudinally spaced coaxial socket bearings whereby the strength, durability and flexibility of the conduit structure are greatly increased.

The improved sealing means herein disclosed is easily installed and replaced, and is self-adjusting so that considerable wear of the journaled parts may take place without destroying the seal between the relatively rotatable conduit members.

I claim:

1. In a flexible metallic conduit structure, a pair of telescopically engaged conduit sections relatively rotatable about the central longitudinal axis of the conduit, an outwardly projecting annular shoulder on one section, an inwardly projecting annular shoulder on the other section, said shoulders having substantially aligned sealing surfaces in the same radial plane, a gasket positioned to simultaneously bear laterally against said relatively movable sealing surfaces, the sealing face of the gasket being split to provide independently movable annular portions engaging respectively the two sealing surfaces on the shoulders.

2. In a flexible metallic conduit structure, a pair of telescopically engaged conduit sections relatively rotatable about the central longitudinal axis of the conduit, an outwardly projecting annular shoulder on one section, an inwardly projecting annular shoulder on the other section, said shoulders having substantially aligned sealing surfaces in the same radial plane, a gasket positioned to simultaneously bear laterally against said relatively movable sealing surfaces, there being an annular recess of T-shaped cross section formed in the gasket with the leg of the T extending out through the sealing face of the gasket so as to divide this front face into two independently movable portions adapted to engage the respective sealing surfaces on the shoulders, and a continuous rear face portion connecting the two sealing portions, and means for yieldingly holding the gasket in sealing position.

3. In a flexible metallic conduit structure, a pair of telescopically engaged conduit sections relatively rotatable about the central longitudinal axis of the conduit, an outwardly projecting annular shoulder on one section, an inwardly projecting annular shoulder on the other section, said shoulders having substantially aligned sealing surfaces in the same radial plane said surfaces forming one end of a pocket between the sections, a gasket positioned in the pocket to simultaneously bear laterally against said relatively movable sealing surfaces, there being an annular recess of T-shaped cross section formed in the gasket with the leg of the T extending out through the sealing face of the gasket so as to divide this front face into two independently movable portions adapted to engage the respective sealing surfaces on the shoulders, and a continuous rear face portion connecting the two sealing portions, the front sealing portion of the gasket being of a hard composition and the integral rear portion being of a soft composition, and means for yieldingly holding the gasket in sealing position and simultaneously spreading the rear portion of the gasket into engagement with the side walls of the pocket.

4. In a flexible metallic conduit structure, a pair of telescopically engaged conduit sections relatively rotatable about the central longitudinal axis of the conduit, an outwardly projecting annular shoulder on one section, an inwardly projecting annular shoulder on the other section, said shoulders having substantially aligned sealing surfaces in the same radial plane, a gasket positioned to simultaneously bear laterally against said relatively movable sealing surfaces, the sealing face of the gasket being of hard composition and being split to provide independently movable annular portions engaging the two sealing surfaces on the shoulders and the integral rear portion of the gasket being of a soft composition, and means engaging the rear portion for holding the gasket yieldingly in sealing position.

5. In a conduit structure, a pair of conduit members journaled together for relative rotation about the common axis of the conduit, and means for sealing the joint between the relatively rotatable members comprising portions of each conduit member formed with sealing surfaces positioned in subtstantially the same radial plane, and a gasket positioned to simultaneously bear laterally against the two sealing surfaces, the sealing surface of the gasket being split to provide independently movable portions engaging respectively the two sealing surfaces on the members.

6. In a conduit structure, a pair of conduit members journaled together for relative rotation about the common axis of the conduit, and means for sealing the joint between the relatively rotatable members comprising portions of each conduit member formed with sealing surfaces positioned in substantially the same radial plane, and a gasket positioned to simultaneously bear laterally against the two sealing surfaces, there being an annular recess of T-shaped cross section formed in the gasket with the leg of the T extending out through the sealing face of the gasket to divide this face into two sealing portions adapted to independently engage the respective sealing surfaces on the two conduit members.

7. In a conduit structure, a pair of conduit members journaled together for relative rotation about the common axis of the conduit, and means for sealing the joint between the relatively rotatable members comprising portions of each conduit member formed with sealing surfaces positioned in substantially the same radial plane, and a gasket positioned to simultaneously bear laterally against the two sealing surfaces, there being an annular recess of T-shaped cross section formed in the gasket with the leg of the T extending out through the sealing face of the gasket to divide this face into two sealing portions adapted to independently engage the respective sealing surfaces on the two conduit members, the front sealing portions of the gasket being of a relatively hard composition and the integral rear portion being of a relatively soft composition.

8. In a flexible metallic conduit structure, a pair of conduit members one telescopically engaged within the other, there being a pair of spaced coaxial bearings between the two members whereby they are journaled for relative rotation about the longitudinal axis of the conduit, the inner member having an outwardly projecting annular collar thereon provided with front and rear bearing surfaces positioned in substantially parallel radial planes, the outer member comprising detachable portions and having a collar portion projecting inwardly in substantial radial alignment with the inner collar and a second annular portion projecting inwardly behind the rear surface of the inner collar, a thrust bearing between this second portion and the rear surface of the inner collar, the front radial sealing surfaces of the inner and outer collars being positioned in substantially the same radial plane and forming one end face of an annular pocket formed between the two conduit members, a gasket positioned in the pocket and a spring behind the gasket and forcing the gasket into engagement with the sealing surfaces of the collars, the sealing face of the gasket being split to provide independently movable annular portions engaging respectively the two sealing surfaces on the shoulders.

9. In a flexible metallic conduit structure, a pair of telescopically engaged conduit members one of which has an elbow shaped end portion and is formed adjacent its open end with a sleeve bearing for the other members and also formed in the elbow with an internal socket bearing coaxial with the sleeve bearing, the other conduit member fitting rotatably within the first member and having an extension provided with a stud journaled in the socket, this inner conduit member having an outwardly projecting annular collar provided with front and rear bearing surfaces positioned in substantially parallel radial planes, the outer conduit member having a portion projecting in spaced relation around the inner member so as to form an annular gasket receiving pocket and comprising a detachable portion projecting inwardly behind the rear surface of the inner collar, a thrust bearing between this detachable portion and the collar, there being a radial bearing surface formed in the outer conduit member in substantially the same plane as the front bearing surface on the collar, a gasket in the pocket and a spring behind the gasket forcing it into engagement simultaneously with the radial bearing surfaces on the two conduit members, the sealing face of the gasket being split to provide independently movable annular portions engaging respectively the two sealing surfaces.

10. In a flexible metallic conduit structure, a pair of telescopically engaged conduit members one of which has an elbow shaped end portion and is formed adjacent its open end with a sleeve bearing for the other members and also formed in the elbow with an internal socket bearing coaxial with the sleeve bearing, the other conduit member fitting rotatably within the first member and having an extension provided with a stud journaled in the socket, this inner conduit member having an outwardly projecting annular collar provided with front and rear bearing surfaces positioned in substantially parallel radial planes, the outer conduit member having a portion projecting in spaced relation around the inner member so as to form an annular gasket receiving pocket and comprising a detachable portion projecting inwardly behind the rear surface of the inner collar, a thrust bearing between this detachable portion and the collar, there being a radial bearing surface formed in the outer conduit member in substantially the same plane as the front bearing surface on the collar, a gasket in the pocket and a spring behind the gasket forcing it into engagement simultaneously with the radial bearing surfaces on the two conduit members, there being an annular recess of T-shaped cross section formed in the gasket with the leg of the T extending out through the sealing face of the gasket to divide this face into two sections adapted to independently engage the respective sealing surfaces.

11. In a flexible metallic conduit structure, a pair of telescopically engaged conduit members one of which has an elbow shaped end portion and is formed adjacent its open end with a sleeve bearing for the other members and also formed in the elbow with an internal socket bearing coaxial with the sleeve bearing, the other conduit member fitting rotatably within the first member and having an extension provided with a stud journaled in the socket, this inner conduit member having an outwardly projecting annular collar provided with front and rear bearing surfaces positioned in substantially parallel radial planes, the outer conduit member having a portion projecting in spaced relation around the inner member so as to form an annular gasket receiving pocket and comprising a detachable portion projecting inwardly behind the rear surface of the inner collar, a thrust bearing between this detachable portion and the collar, there being a radial bearing surface formed in the outer conduit member in substantially the same plane as the front bearing surface on the collar, a gasket in the pocket and a spring behind the gasket forcing it into engagement simultaneously with the radial bearing surfaces on the two conduit members, there being an annular recess of T-shaped cross section formed in the gasket with the leg of the T extending out through the sealing face of the gasket to divide this face into two sections adapted to independently engage the respective sealing surfaces, the front sealing portions of the gasket being of a hard composition and the integral rear portion being of a soft composition whereby the gasket will be spread laterally into engagement with the cylindrical walls of the pocket.

EDWARD A. RUSSELL.